United States Patent [19]

Bartlett

[11] Patent Number: 5,168,605
[45] Date of Patent: Dec. 8, 1992

[54] METHOD AND APPARATUS FOR SECURING A TARP

[76] Inventor: Russell Bartlett, 61125 Landreth La., St. Helens, Oreg. 97051

[21] Appl. No.: 794,019

[22] Filed: Nov. 19, 1991

Related U.S. Application Data

[63] Continuation-in-part of Ser. No. 655,978, Feb. 15, 1991.

[51] Int. Cl.⁵ .............................................. A44B 21/00
[52] U.S. Cl. ................................... 24/519; 24/129 R; 24/300; 24/459
[58] Field of Search .................. 24/300, 459, 463, 519, 24/462, 464, 129 R, 129 A; 135/119

[56] References Cited

U.S. PATENT DOCUMENTS

| | | | |
|---|---|---|---|
| Re. 12,063 | 12/1902 | O'Brien . | |
| D. 288,162 | 2/1987 | Hutton et al. | D6/606 |
| 697,808 | 4/1902 | Chauvet . | |
| 1,153,334 | 9/1915 | Oswald | 24/300 |
| 1,233,834 | 7/1917 | Baumann . | |
| 1,562,027 | 11/1925 | Laird . | |
| 1,602,305 | 10/1926 | Helm . | |
| 2,041,498 | 5/1936 | Swidersky | 24/222 |
| 2,561,371 | 7/1951 | Hill | 24/129 R |
| 2,857,643 | 10/1958 | Tomsic | 24/72.5 |
| 2,939,195 | 6/1960 | Carlson | 24/245 |
| 3,452,491 | 7/1969 | Trent | 24/73 |
| 3,888,448 | 6/1975 | Rowland | 24/129 R |
| 3,913,186 | 10/1975 | Ray et al. | 24/459 |
| 4,393,558 | 7/1983 | Herwegh et al. | 24/459 |
| 4,660,240 | 4/1987 | Hutton et al. | 5/451 |
| 4,688,304 | 8/1987 | Marcott | 24/459 |
| 4,782,543 | 11/1988 | Hutton et al. | 24/72.5 |
| 4,831,692 | 5/1989 | Chuan | 24/129 R |
| 4,862,541 | 9/1989 | Hutton et al. | 5/496 |
| 4,910,834 | 3/1990 | Minkler | 24/129 |
| 5,033,170 | 7/1991 | Ewert | 24/459 |
| 5,046,222 | 9/1991 | Byers et al. | 24/459 |
| 5,074,014 | 12/1991 | Freeman | 24/519 |

FOREIGN PATENT DOCUMENTS 1279412  11/1961  France .................... 24/464

Primary Examiner—Victor N. Sakran
Attorney, Agent, or Firm—Marger, Johnson, McCollom & Stolowitz

[57] ABSTRACT

A method and apparatus for securing a tarp in which a planar clip having an elongate opening is placed on one side of the tarp. The opening has a wide end and a narrow end. A first portion of the opening has substantially straight edges which taper towards one another. The wide end is formed in the first portion. A second portion of the opening has substantially straight edges which are substantially parallel to one another. A button having a base, a neck and a head engages the clip with a tarp therebetween thereby securing the clip to the tarp. An elastic cord is connected to a hook at one end thereof which is connected to a structural member. The other end of the elastic cord is stretched and connected to the clip at a selected location on the cord thereby securing the tarp.

14 Claims, 2 Drawing Sheets

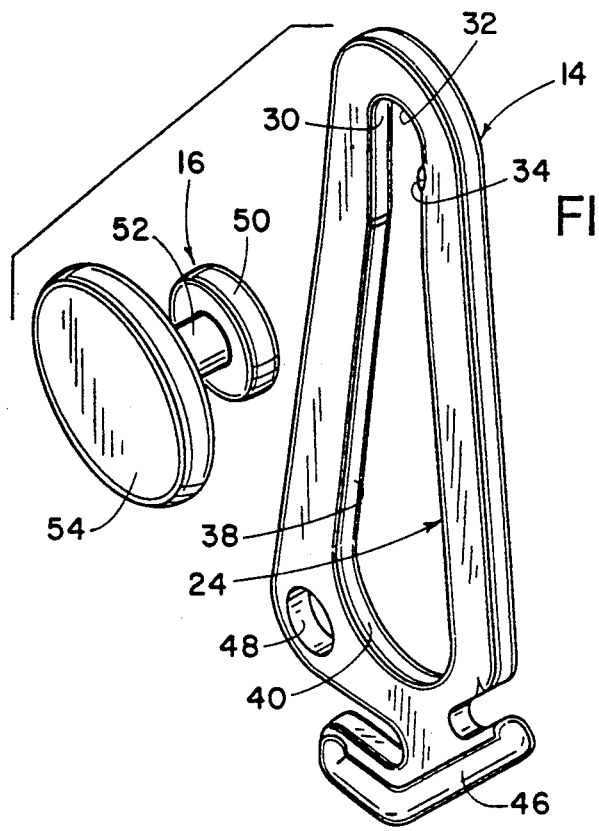
FIG. 1
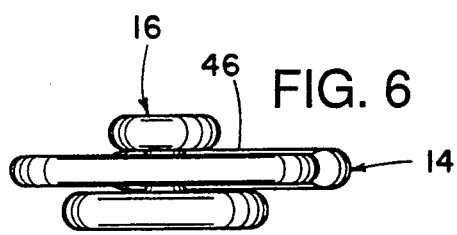
FIG. 6
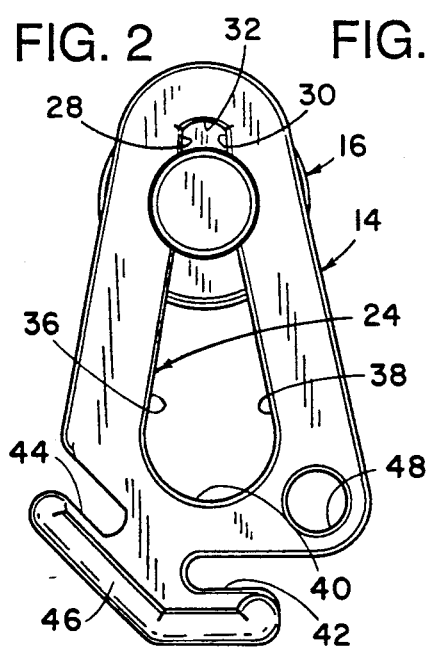
FIG. 2    FIG. 3
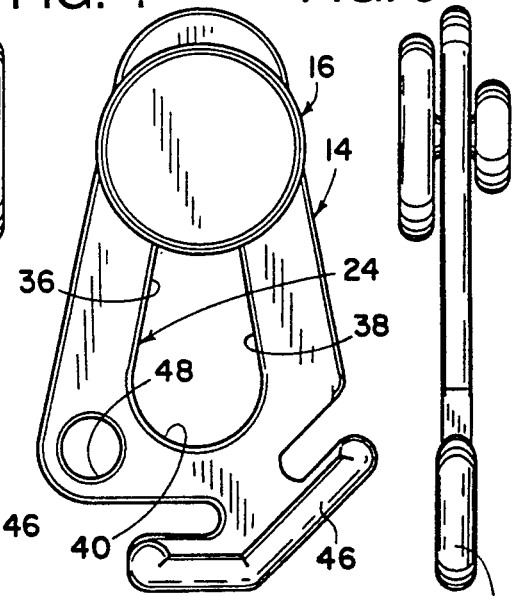
FIG. 4    FIG. 5
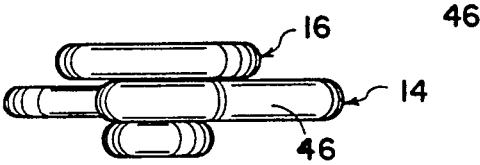
FIG. 7

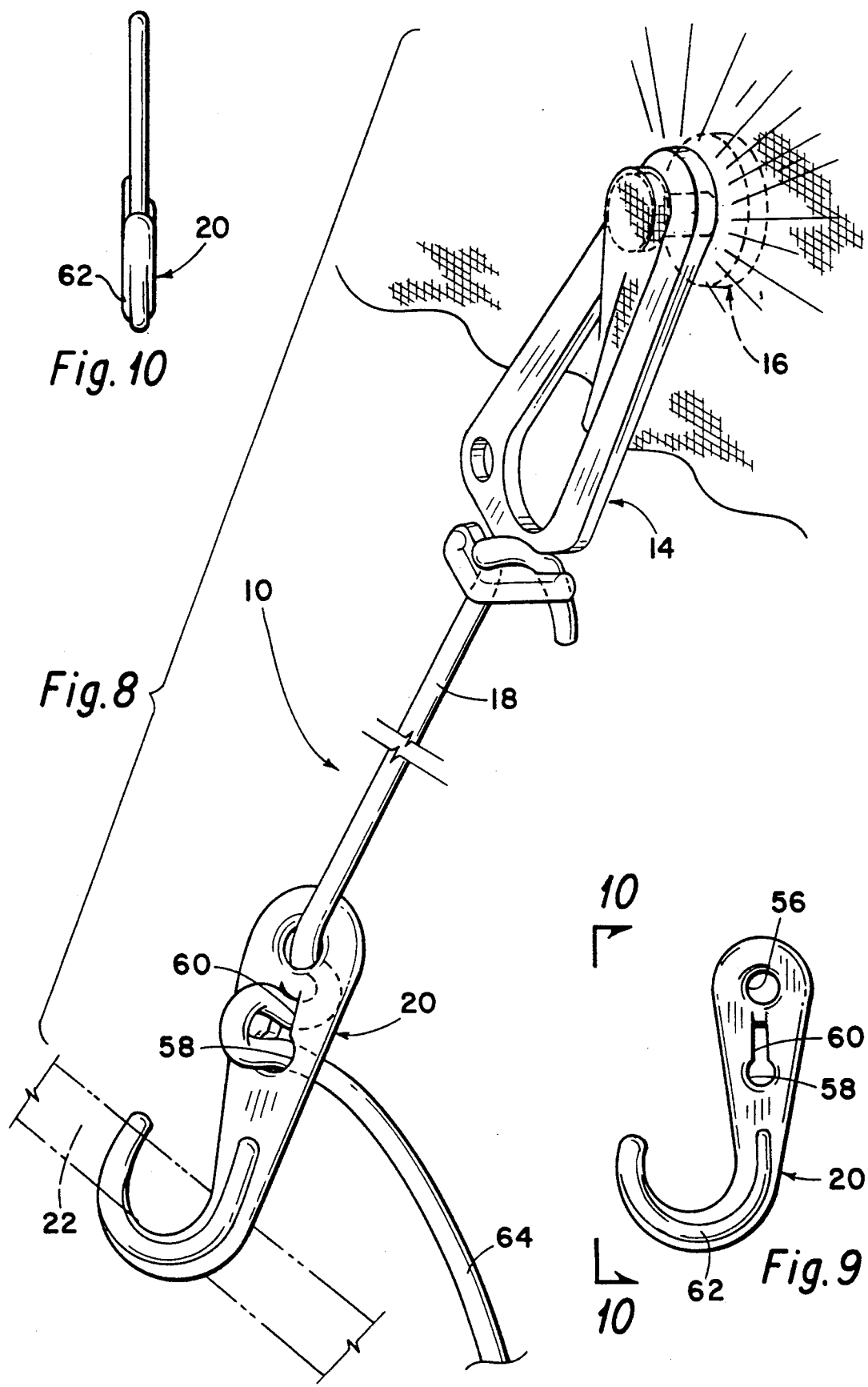

METHOD AND APPARATUS FOR SECURING A TARP

This application is a continuation-in-part of U.S. Pat. application Ser. No. 07/655,978 filed Feb. 15, 1991.

BACKGROUND OF THE INVENTION

1. Field of the Invention

The present invention relates generally to methods and apparatus for securing tarps and more particularly to such methods and apparatus in which a cord or line is connected to a tarp at a selected location on the surface of the tarp.

2. Description of the Related Art

Fasteners for web-like articles, such as tarps, are known in the art. Fasteners such as those disclosed in U.S. Pat. No. 4,688,304 to Marcott; U.S. Pat. No. 2,939,195 to Carlson; and U.S. Pat. No. 3,913,186 to Ray et al. each incorporate a pair of interconnecting bodies which are disposed on opposite sides of a tarp or the like. The bodies are then connected to wedge the tarp therebetween and a line is attached to one of the bodies to secure the tarp. U.S. Pat. No. 4,393,558 to Herwegh et al. discloses a similar fastener for sheet material in which one of the bodies includes a spike which pierces the material. U.S. Pat. No. 5,033,170 to Ewert discloses a snap-on fastener for web-like articles in which one of the bodies comprises a circular button which snaps into a locking position in a corresponding circular hole in a frame. When the button and frame are placed on opposite sides of a tarp and the button is locked in the frame, a line is connected to the frame to secure the tarp.

Several patents to Hutton et al. disclose a plate which interconnects with a stud on opposite sides of a sheet to secure the same to a mattress. For example, U.S. Pat. No. 4,782,543 to Hutton et al. discloses attachment of flat sheets to water beds in which the plate is connectable to the ends of a pair of elastic cords.

Prior art devices for securing web-like articles such as sheets or tarps suffer from several disadvantages. First, few of the prior art devices utilize an elastic cord. When a pair of bodies are positioned on opposite sides of a tarp and secured thereto as described above, connecting one of the bodies to an elastic cord for securing the tarp would desirable. As noted above, one of the Hutton et al. patents utilizes an elastic cord. It, however, can only be connected to the fastener device at the end of the cord. It would be advantageous to be able to anchor one end of an elastic cord, stretch the other end until a predetermined level of tension is in the cord and then connect the cord to the fastener device at a location along the cord which maintains the tension level.

With respect to the fastener devices utilized in the prior art, the Marcott, Carlson and Ray et al. devices noted above each incorporate a button or stud which is placed on one side of a tarp opposite a frame having an opening therein. The tarp is secured by pushing a button through a large portion in the opening and thereafter sliding the button, and the tarp surrounding the button, to a smaller portion of the opening. Because the button does not positively lock with the frame, a secure connection to the tarp is not made.

Those devices which provide positive connection of the button to the frame, with the tarp therebetween, are difficult to use with thick tarps. While most are usable with relatively thin tarps, the openings in the frame in which the button is received may not be sized appropriately for a relatively thick tarp. It would be desirable to provide a tarp fastener having a clip or frame which positively connects to the tarp for a broad range of tarp thicknesses.

SUMMARY OF THE INVENTION

In one aspect, the present invention comprises an apparatus for securing a tarp comprising a substantially planar clip having an elongate opening therethrough. The opening has a wide end and a narrow end. A first portion of the opening has substantially straight edges which taper toward one another. The wide end is formed in the first portion. The second portion of the opening has substantially straight edges which are substantially parallel to one another. A button includes a base, a neck, and a head with the head being of a size which prevents it from passing through the opening. The base is of a size which permits it to pass through the first portion of the opening but prevents it from passing through the second portion of the opening. When a tarp is disposed between the clip and the button, the neck is receivable in the opening. The tarp is wedgeable between the button and the clip as the button slides from the wide end toward the narrow end of the opening.

In another aspect of the invention, the apparatus includes means for attaching an elastic cord to a clip at a location along the cord which maintains a desired level of tension in the cord. The present invention is also implemented in a method.

The present invention overcomes the above-noted disadvantages associated with prior art devices and methods. More particularly, the present invention provides a clip and button which positively interlock with one another when positioned on opposite sides of a tarp thereby firmly engaging tarps having a wide range of thickness. Additionally, the present invention provides means for anchoring one end of elastic cord and thereafter stretching the elastic cord to place a predetermined level of tension in the cord and connecting the cord to a clip mounted on a tarp at a selected length along the cord.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a perspective exploded view of a tarp clip and button constructed in accordance with the present invention.

FIG. 2 is a front elevation of the tarp clip and button of the present invention interconnected.

FIG. 3 is a right side elevational view of the interconnected button and clip of FIG. 2.

FIG. 4 is a rear elevational view of the interconnected button and clip of FIG. 2.

FIG. 5 is a left side elevational view of the interconnected button and clip of FIG. 2.

FIG. 6 is a top plan view of the interconnected button and clip of FIG. 4.

FIG. 7 is a bottom plan view of the interconnected button and clip of FIG. 4.

FIG. 8 is a perspective view of the button and clip of FIGS. 1-7 in use in accordance with the present invention.

FIG. 9 is a front elevational view of the hook illustrated in FIG. 8.

FIG. 10 is a side elevational view of the hook shown in FIG. 9.

DETAILED DESCRIPTION OF THE PREFERRED EMBODIMENTS

Indicated generally at 10 in FIG. 8 is a tie-down device constructed in accordance with the present invention. Device 10 is shown in use securing a tarp 12, a portion of which is shown. The tie-down device includes a clip 14 and a button 16, shown with tarp 12 thereover and engaged with clip 14 in FIG. 8. Clip 14 is connected to a smooth elastic cord 18 which in turn is connected to a hook 20. Preferably, cord 18 is made from a thermoplastic elastomer. The hook is engaged with a fixed structural member 22 which does not form a part of the present invention.

Turning now to FIGS. 1-7, further consideration will be given to the detail of the structure of clip 14 and button 16. In the present embodiment of the invention, clip 14, button 16, and hook 20 are all injection molded to form substantially rigid polyamide components. The clip includes an elongate opening 24 having a first or parallel portion comprising a pair of opposed parallel edges 28, 30. Edges 28, 30 are connected by a curved end 32. A ridge 34, only partially visible in FIG. 1, extends from edge 28 into opening 24 and, as will later become more fully apparent, ridge 34 is sized to just permit button 16 to pass thereby in order to hold the button in the opening between the ridge and end 32.

Opening 24 includes a second or tapered portion having opposed tapered edges 36, 38. Edges 36, 38 are connected by a curved end 40. In the present embodiment of the invention, edges 36, 38 form an angle of substantially 20°.

Clip 14 includes a pair of slots 42, 44 the axes of which form an angle of substantially 135°. A reinforced portion 46 forms a lower portion of the clip and provides additional material on the relatively small portions of the clip on the lower side of slots 42, 44. A hole 48 is formed in clip 14.

Considering now the structure of button 16, included therein is a base 50, a neck 52 and a head 54. The base, neck and head are all substantially cylindrical and coaxial with the axis being directed into opening 24 in the view of FIG. 1. When so directed, head 54 cannot pass through opening 24 as can be more fully appreciated in the views of FIGS. 2 and 4. Base 50, on the other hand, can pass through the tapered portion of opening 24 towards end 40. About half way between end 40 and the beginning of the parallel portion of opening 24, tapered edges 36, 38 prevent base 50 from passing through the opening. As can be seen in the views of FIGS. 2-5, when base 50 passes through opening 24 towards end 40, it may thereafter be urged upwardly, in the view of FIGS. 2-5, into the position shown.

In the view of FIGS. 2-7, neck 52 is shown received in the parallel portion of opening 24 between edges 28, 30. The neck is located just below ridge 34. When button 16 is pushed upwardly, in the view of FIGS. 2-7, it must be forced between ridge 34 and edge 30. When so forced, ridge 34 holds button 16 with neck 52 against end 32 of the opening. The button is thus securely maintained in position.

Turning now to FIG. 9, and considering further the structure of hook 20, included therein is a first hole 56. A second hole 58 is in communication with a slot 60. Hook 20 includes a reinforced portion 62 to impart additional strength to the hook.

Turning now to FIG. 8 and considering the operation of tie-down device 10, tarp 12 is placed over an object or articles which are to be protected by the tarp, e.g., a load on a truck bed. Once the tarp is positioned over the load, a user grasps button 16 by head 54 and positions the button on one side of the tarp and clip 14 on the other. Next, base 50 is pushed through opening 24 near end 40 and is thereafter forced toward end 32 of opening 24. When tarp 12 is relatively thin, the button may be forced to the point that neck 52 is received in the parallel portion of opening 24 above ridge 34 thereby locking the button and securing the tarp between the button and the clip.

When tarp 12 is thicker, neck 52 may still be received in the parallel portion of the opening with the tarp wedged between neck 52 and edges 28, 30. The tarp may be thick enough to prevent the button from being forced above ridge 34. The wedging of the tarp between the button and the edges of the clip firmly secures the clip to the tarp. In the case of an even thicker tarp, the tarp may be wedged between neck 52 and tapered edges 36, 38 before neck 52 reaches the parallel portion of opening 24. In such a case, the wedging action secures the clip to the tarp.

Slots 42, 44 should be oriented generally in the direction of the location for anchoring cord 18. In any event, once clip 14 is secured to the tarp in one of the manners above-described, cord 18 is secured to hook 20.

To secure the cord to the hook, a user inserts end 64 through hole 56. The direction of end 64 is then reversed and inserted through hole 58. Next, the user grasps the cords on both sides of the hook and forces that portion of the cord received in hole 58 into slot 60. Finally, end 64 is again reversed and inserted into hole 58 thus placing cord 18 and hook 20 into the configuration shown in FIG. 8.

Hook 20 is then secured over structural member 22. The user pulls the cord near the end with one hand while holding clip 14 with the other. When the desired tension is exerted in the cord, the cord is inserted into slot 42 as shown in FIG. 8. While continuing to hold tension in the cord the user inserts the other side of the cord into slot 44 so that the cord and clip 14 assume the configuration shown in FIG. 8. The relative sizes of the slots and cord, and the elastic nature of the cord, secure the cord as shown.

For a tarp having eyelets, another hook, like hook 20 may be secured to cord 18 rather than clip 14. The cord thus includes hooks on either end, one to anchor the cord, like hook 18 in FIG. 8, the other hook being hooked to the tarp eyelet to secure the tarp. In another configuration, a plurality of clips are connected to a tarp at spaced intervals as described above. A plurality of hooks, like hook 20, are staggered between, and beneath, the clips with each hook being connected to a structural member. The cord is then run through the holes in the clips, like hole 48, and the holes in the hooks, like hole 56, in an alternating, i.e., hook-clip-hook-clip, etc. manner. So connecting the cord with the hooks and clips conforms the cord into a zig-zag pattern. The cord is secured at both ends by connecting it to the last hook or clip, as the case may be, in the manner illustrated in FIG. 8. The cord is then free to self-adjust so that uniform tension is applied between each hook and clip.

Clip 14 and button 16, as well as hook 20, may also be used with stretch cords of the type having fabric coverings or with inelastic lines and rope. However, when using line or cord other than a smooth elastic cord, the cord should be installed on clip 14 as shown in FIG. 8. Thereafter, the free end of the cord should again be inserted into slot 42 and pulled firmly until the cord slips under that portion of the cord already in the slot. This prevents slipping of the cord or line.

To fasten the hook with a stretch cord, rope or the like, the end thereof is passed through hole 56, reversed and passed 58. Thereafter, the end of the line or cord is inserted beneath the loop of cord which extends between holes 56, 58. Once pulled tight, the line or cord is secure and is prevented from slipping.

Having illustrated and described the principles of my invention in a preferred embodiment thereof, it should be readily apparent to those skilled in the art that the invention can be modified in arrangement and detail without departing from such principles.

I claim all modifications coming within the spirit and scope of the accompanying claims.

1. An apparatus for securing a tarp comprising:
   a substantially planar clip having an elongate opening therethrough, said opening having a wide end and a narrow end;
   a first portion of said opening having substantially straight edges which taper toward one another, said wide end being formed in said first portion;
   a second portion of said opening having substantially straight edges which are substantially parallel to one another; and
   a button having a base, a neck and a head, said head being of a size which prevents it from passing through said opening, said base being of a size which permits it to pass through said wide end and prevents it from passing through said narrow end and said neck being receivable in said opening when said tarp is disposed between said clip and said button, said tarp being wedgeable between said button and said clip as said button slides from the wide end toward the narrow end of said opening.

2. The apparatus of claim 1 wherein the edges of said first portion form an angle of substantially 20°.

3. The apparatus of claim 1 wherein one of said edges in said second portion of said opening includes a ridge extending into said opening, said neck being sized to interferingly pass between said ridge and the other of said second portion edges.

4. The apparatus of claim 1 wherein said button is received in said first portion when a relatively thick tarp is wedged between said button and said clip and said neck is received in said opening with said tarp disposed between said clip and said button.

5. The apparatus of claim 1 wherein said button is received in said second portion when a relatively thin tarp is wedged between said button and said clip and said neck is received in said opening with said tarp disposed between said clip and said button.

6. The apparatus of claim 1 wherein said apparatus further includes:
   an elastic cord; and
   means for attaching said elastic cord to said clip.

7. The apparatus of claim 6 wherein said means for attaching said elastic cord to said clip comprises a pair of slots formed in said clip for receiving and holding said cord at a selected location along the length thereof.

8. A method for securing a tarp comprising the steps of:
   securing a clip to the tarp at a selected location on the surface of the tarp;
   anchoring one of an elastic cord;
   orienting the cord so that it is generally along an axis extending between the anchored end of the cord and the clip;
   gripping the cord near the free end thereof;
   pulling the free end of the cord at the gripped location while so orienting the cord;
   stretching the cord until the gripped location is beyond the clip;
   placing a desired level of tension in the cord;
   attaching the cord to the clip at a location along the cord between the gripped location and the anchored end which maintains the desired level of tension; and
   wherein said clip includes a pair of open—ended slots and wherein the step of attaching the cord to the clip at a location along the cord between the gripped location and the anchored end which maintains the desired level of tension comprises the steps of:
   inserting the cord into one of said slots through the open end thereof; and
   inserting the cord into the other slot through the open end thereof.

9. The method of claim 8 wherein the step of securing a clip to the tarp at a selected location on the surface of the tarp comprises the steps of:
   placing the clip on one side of the tarp at the selected location;
   placing a button on the other side of the tarp opposite the clip; and
   connecting the button to the clip with the tarp wedged therebetween.

10. The method of claim 8 wherein the step of anchoring one end of an elastic cord comprises the steps of:
    securing one end of the cord to a hook; and
    attaching the hook to a solid object.

11. The method of claim 10 wherein said hook includes first and second holes, said second hole having a slot in communication therewith, and wherein the step of securing one end of the cord to the hook comprises the steps of:
    inserting said one end of said cord into said first hole;
    inserting said one end of said cord into said second hole; and
    pulling that portion of said cord in said second hole into slot.

12. The method of claim 8 wherein said slots are at an angle of substantially 135°.

13. The method of claim 8 wherein said method further comprises the step of maintaining the desired level of tension in said cord after the step of inserting the cord into one of said slots through the open end thereof.

14. An apparatus for securing a tarp comprising:
    a substantially planar clip having an elongate opening therethrough, said opening having a wide end and a narrow end, all of said wide end being wider than said narrow end;
    a first portion of said opening having substantially straight edges which taper toward one another, said wide end being formed in said first portion;
    a second portion of said opening having substantially straight edges which are substantially parallel to one another and which join the edges of said first portion at substantially the narrowest part of said first portion; and a button having a base, a neck and a head, said head being of a size which prevents it from passing through said opening, said base being of a size which permits it to pass through said wide end and prevents it from passing through said narrow end and said neck being receivable in said opening when said tarp is disposed between said clip and said button, said tarp being wedgeable between said button and said clip at a location dependent upon tarp thickness as said button slides from the wide end toward the narrow end of said opening.

* * * * *

UNITED STATES PATENT AND TRADEMARK OFFICE
CERTIFICATE OF CORRECTION

PATENT NO. : 5,168,605
DATED : December 8, 1992
INVENTOR(S) : Russell Bartlett

It is certified that error appears in the above-indentified patent and that said Letters Patent is hereby corrected as shown below:

Column 1        Line 43, after "would" insert --be--;

Column 6        Line 3, after "one" insert --end--.

Signed and Sealed this

Twenty-ninth Day of March, 1994

Attest:

BRUCE LEHMAN

*Attesting Officer*      *Commissioner of Patents and Trademarks*